(12) United States Patent  (10) Patent No.: US 7,490,688 B2
Yamamoto  (45) Date of Patent: Feb. 17, 2009

(54) MOTORCYCLE FRAME

(75) Inventor: Yoshiaki Yamamoto, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 269 days.

(21) Appl. No.: 11/492,331

(22) Filed: Jul. 25, 2006

(65) Prior Publication Data

US 2007/0193807 A1 Aug. 23, 2007

(30) Foreign Application Priority Data

Jul. 25, 2005 (JP) ............................. 2005-214876
Jun. 16, 2006 (JP) ............................. 2006-167947

(51) Int. Cl.
 *B62K 11/00* (2006.01)
(52) U.S. Cl. ..................... 180/228; 180/230; 180/227
(58) Field of Classification Search ................ 180/227, 180/228, 230
See application file for complete search history.

(56) References Cited

U.S. PATENT DOCUMENTS

| 4,505,352 A | * | 3/1985 | Onda ......................... 180/219 |
| 4,830,163 A | * | 5/1989 | Miyazaki et al. ...... 192/105 CD |
| 5,044,646 A | * | 9/1991 | Iiga et al. .................... 180/219 |
| 6,109,127 A | | 8/2000 | Liau |
| 6,267,700 B1 | * | 7/2001 | Takayama .................... 474/93 |
| 6,341,659 B1 | * | 1/2002 | Ibukuro ...................... 180/219 |
| 6,412,451 B2 | * | 7/2002 | Kuga et al. ............... 123/41.72 |
| 6,505,581 B2 | * | 1/2003 | Niizuma et al. ........ 123/41.82 R |
| 6,808,465 B2 | * | 10/2004 | Kuga et al. .................... 474/14 |
| 7,182,167 B2 | * | 2/2007 | Sasamoto ................... 180/219 |
| 2001/0034280 A1 | | 10/2001 | Kuga et al. |
| 2005/0090371 A1 | * | 4/2005 | Nakajima et al. ........... 477/181 |

FOREIGN PATENT DOCUMENTS

| EP | 0 581 310 | 2/1994 |
| FR | 2 722 756 | 1/1996 |
| JP | 2004-276643 | 7/2004 |
| JP | 2004-217147 | 8/2004 |
| WO | WO 2004/071858 | 8/2004 |

OTHER PUBLICATIONS

European Search Report of EP Application No. 06 01 5505 dated Oct. 28, 2008.

* cited by examiner

*Primary Examiner*—Paul N Dickson
*Assistant Examiner*—Michael R Stabley
(74) *Attorney, Agent, or Firm*—Knobbe, Martens, Olson & Bear, LLP

(57) ABSTRACT

A motorcycle can include a frame having first and second side frame members. A swing-type motor unit can be mounted on the frame for up and down swinging movement. The frame can include cross members disposed on two sides of a pivot connecting the motor unit to the frame.

16 Claims, 13 Drawing Sheets

US 7,490,688 B2

MOTORCYCLE FRAME

PRIORITY INFORMATION

This application is based on and claims priority under 35 U.S.C. § 119 to Japanese Patent Application No. 2005-214876, filed on Jul. 25, 2005 and Japanese Patent Application No. 2006-167947, filed on Jun. 16, 2006, the entire contents of both of which are hereby expressly incorporated by reference.

BACKGROUND OF THE INVENTIONS

1. Field of the Inventions

The present inventions relate to motorcycles, and more particularly to motorcycles having a swing-type motor unit mounted on the frame for up and down swinging movement.

2. Description of the Related Art

Some scooter-type motorcycles are available with a swing-type engine unit which includes an engine body integrated with a transmission case having a continuously variable transmission mechanism housed therein. In some designs, engine unit is mounted on a frame for up and down swinging movement.

In such designs, since the engine unit itself should not be used as a rigid member in the same way as other rigid-type swing arms are used in vehicles where the engine is fixed to the frame, it is necessary that the rigidity of the frame itself is enhanced to thereby enhance the supporting rigidity of the engine. Therefore, a large-sized suspension bracket is disposed or a reinforcement member is added, for example, to enhance the rigidity of the foregoing frame. Such a reinforcement member is disclosed in Japanese Patent Document JP-A-2004-276643.

SUMMARY OF THE INVENTIONS

An aspect of at least one of the embodiments disclosed herein includes the realization that the rigidity of a frame of a vehicle can be improved by arranging cross members about a pivot. For example, in a vehicle such as, but without limitation, a motorcycle having a swing-type motor unit pivotally connected to a frame, arranging first and second cross members such that the pivot section is disposed therebetween, the rigidity of the frame itself is enhanced. Further, the motor body can be surrounded by the first and second cross members and the first and second frame members thereby further enhancing the rigidity of the frame.

In accordance with an embodiment, a motorcycle can comprise a frame having first and second side frame members. A swing-type motor unit can be mounted on the frame for up and down swinging movement. The motor unit can comprise a motor body and a transmission case having a power transmission mechanism housed therein. The motor body and the transmission case can be joined together integrally. A pivot section can be supported by the frame and can be formed in a region of at least one of the motor body and the transmission case below a motor output shaft. The frame can comprise first and second cross members positioned with the pivot section disposed therebetween when viewed from the side of the motorcycle. Additionally, the first and second cross members can connect the first and second side frame members and the first and second cross members and the pivot section can be arranged approximately in a straight line when viewed from the side of the motorcycle.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures:

FIG. 14(*b*) is a sectional view of the elastic bushing, taken along line b-b of FIG. 14(*a*).

DETAILED DESCRIPTION OF THE PREFERRED EMBODIMENT

Figure 1:
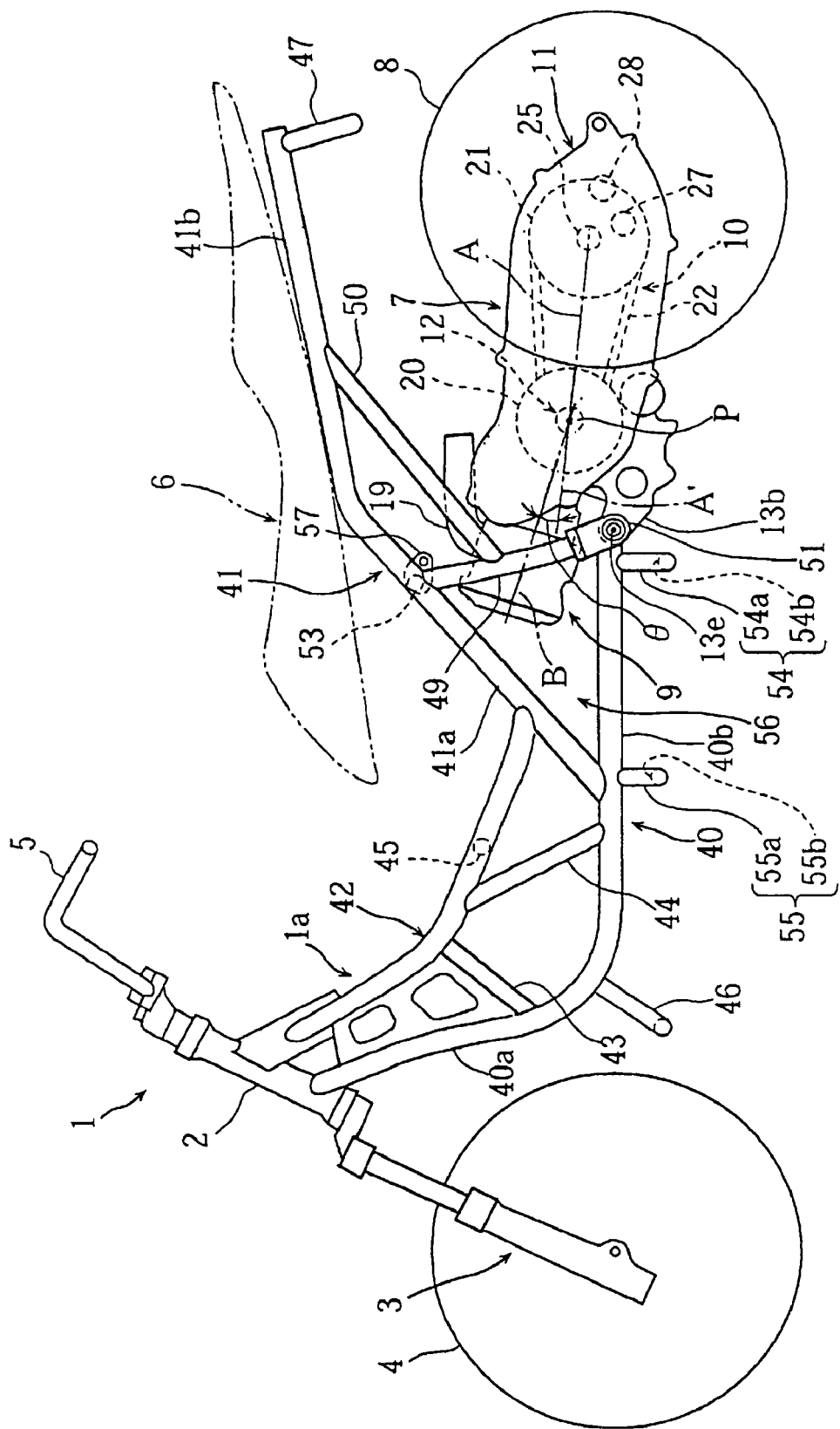
FIG. 1 is a schematic side elevational view of a frame of a motorcycle having an engine unit according to an embodiment.

FIGS. 1 through 14 illustrate a frame according to an embodiment. The frame 1 is disclosed in the context of a motorcycle because it has particular utility in this context. However, the frame 1 can be used in other contexts, such as, for example, but without limitation, all terrain vehicles, golf carts, etc. In this disclosure, the terms "front and rear" or "left and right" means the front and rear or the left and right when viewed by a rider sitting on the seat.

In the figures, numeral 1 denotes a frame of a scooter type motorcycle. The frame 1 can have a head pipe 2 disposed at the forward end of the frame 1, leaning rearwardly at an angle. The frame 1 can also include left and right first and second frame members 1*a*, 1*a* extending rearwardly from the head pipe 2.

A front fork 3 can be pivotally mounted to the head pipe 2 for the leftward and rightward steering. At the lower end of the front fork 3 can be supported a front wheel 4 and at the top thereof can be fixed a steering handlebar 5.

On the first and second frame members 1*a*, 1*a* can be mounted a straddle type seat 6 for one or two riders. A swing-type engine unit 7 configured for up and down swinging movement can be mounted below the seat 6. A rear wheel 8 can be supported at the rear end of the engine unit 7.

The frame 1, although not shown in the figure, can be covered at the front side of the head pipe 2 with a front cover. At the rear side of the head pipe 2 a leg shield can be disposed. Additionally, a side cover can be positioned around a region below of the seat 6 with a side cover.

The engine unit 7 can be an engine body (or "motor body") 9 integrated with a transmission case 11 having a continuously variable transmission mechanism (power transmission mechanism) 10 housed therein. However, other designs can also be used.

The engine body 9 can be water-cooled. In some embodiment, the engine body 9 can define one cylinder and can be configured to operate under the four-stroke combustion principle. The engine body 9 can also include a cylinder block 15 having a piston 14 housed therein for sliding movement and a cylinder head 16 joined to the crank case 13. The crank case 13 can have a crankshaft (motor output shaft) 12 housed therein, at the front mating face, and a head cover 17 can be mounted on the cylinder head 16. The crankshaft 12 can be disposed with crank axis P extending generally horizontally in the lateral direction of the motorcycle, and can be coupled to the piston 14 through a connecting rod 18.

An intake pipe 19 can be in communication with an intake port of the engine body 9. For example, the intake pipe 19 can be connected to an upper wall 16a of the cylinder head 16. The intake pipe 19 can be bent rearwardly from the cylinder head 16. A fuel injection valve 19a can be mounted to the downstream end of the intake pipe 19. A throttle valve 19a can be mounted on the upstream side can of the intake pipe 19. The throttle valve 19a can be mounted in a throttle body 19b. An air cleaner (not shown) can be connected to an upstream end of the throttle body 19b.

In the lower wall 16b of the cylinder head 16 can be formed an external connection of an exhaust port. An exhaust pipe (not shown) can be connected to the connection port. The exhaust pipe can be connected to a muffler (not shown) disposed on the opposite side from the transmission case 11 with respect to the rear wheel 8.

Figure 6:
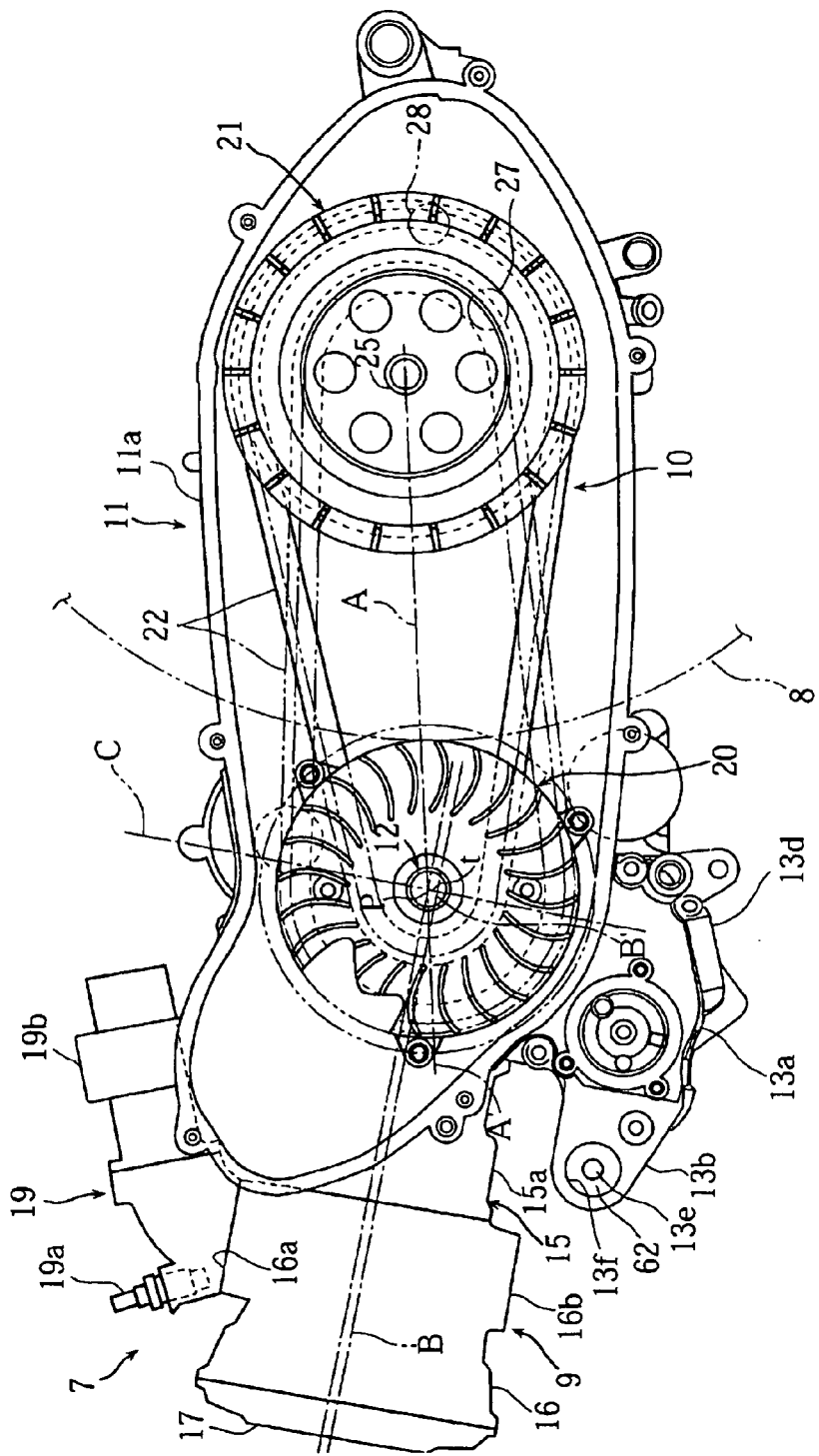
FIG. 6 is a further enlarged side elevational view of the engine unit.

With continued reference to FIG. 6, the continuously variable transmission mechanism 10 can include a driving sheave 20 which can be disposed at the left end 12a of the crankshaft 12 and can extend into the transmission case 11, coaxially with the crankshaft 12. A driven sheave 21 can be disposed in the rear end portion of the transmission case 11. A V-belt 22, made of rubber or plastic, can be stretched over the driven and driving sheaves 20, 21. At the right side end 12b of the crankshaft 12 can be disposed a generator 23. However, other configurations can also be used.

Figure 7:
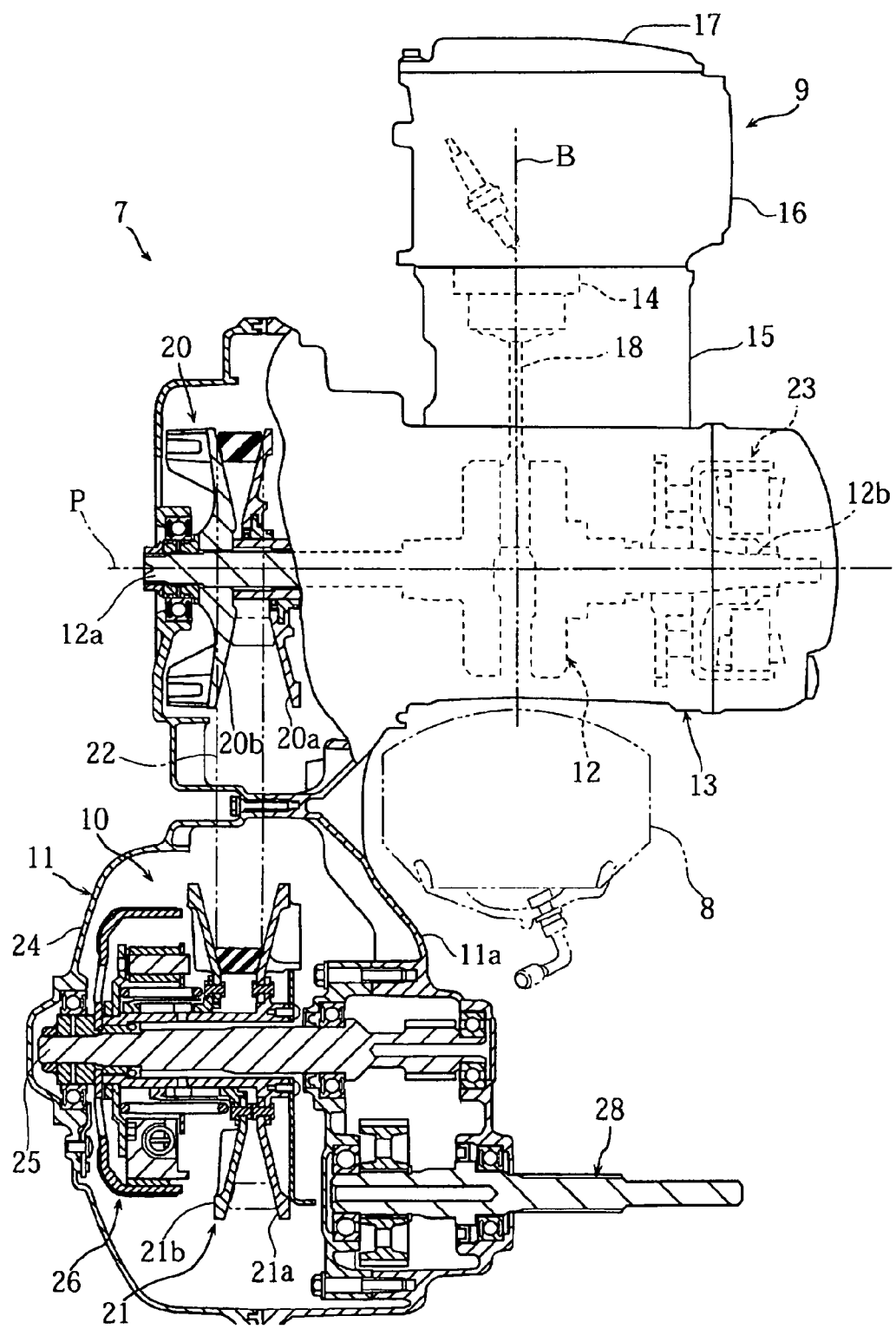
FIG. 7 is a partial sectional and top plan view of the engine unit.
Figure 8:
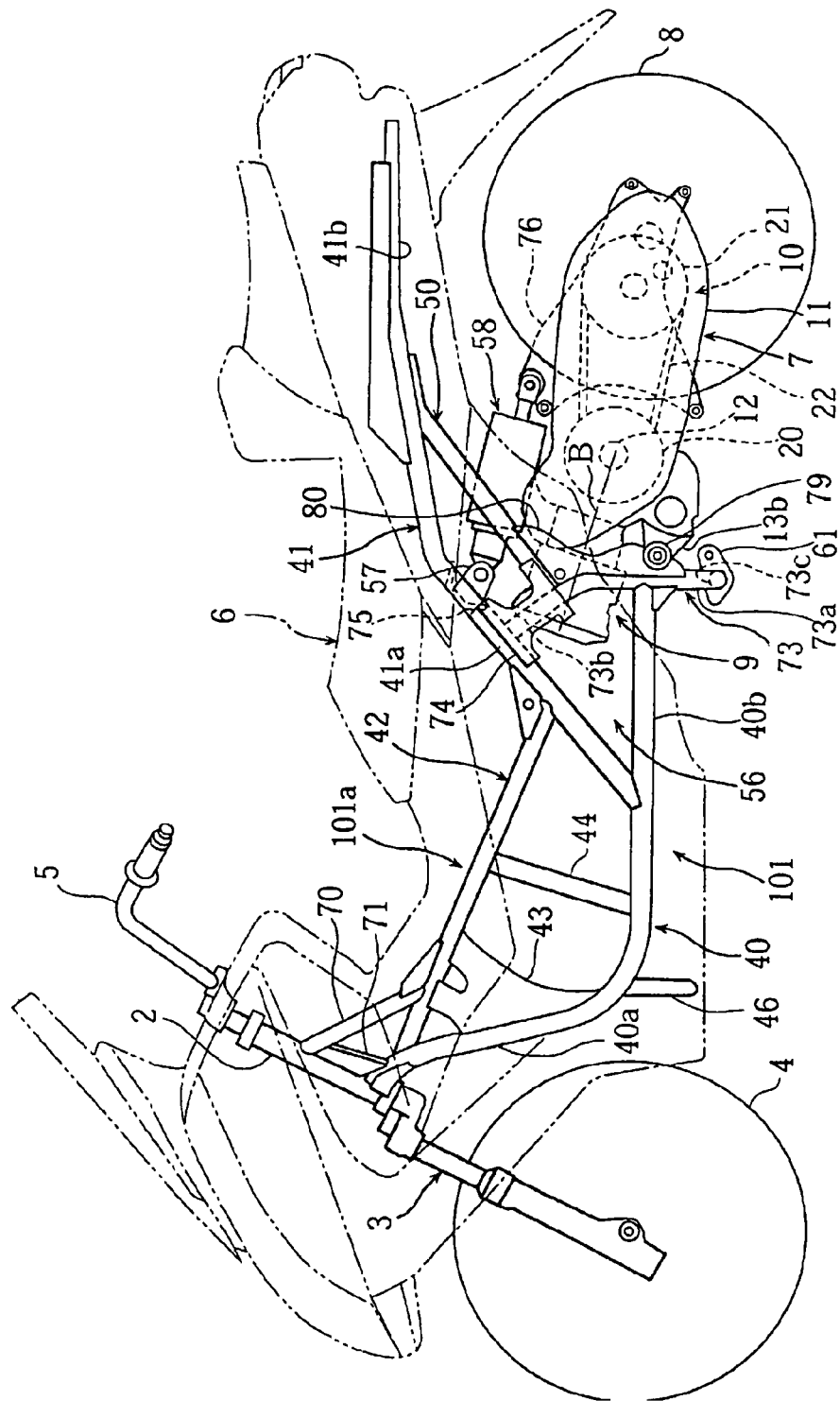
FIG. 8 is a schematic side elevational view of a modification of the motorcycle of FIGS. 1-7.
Figure 9:
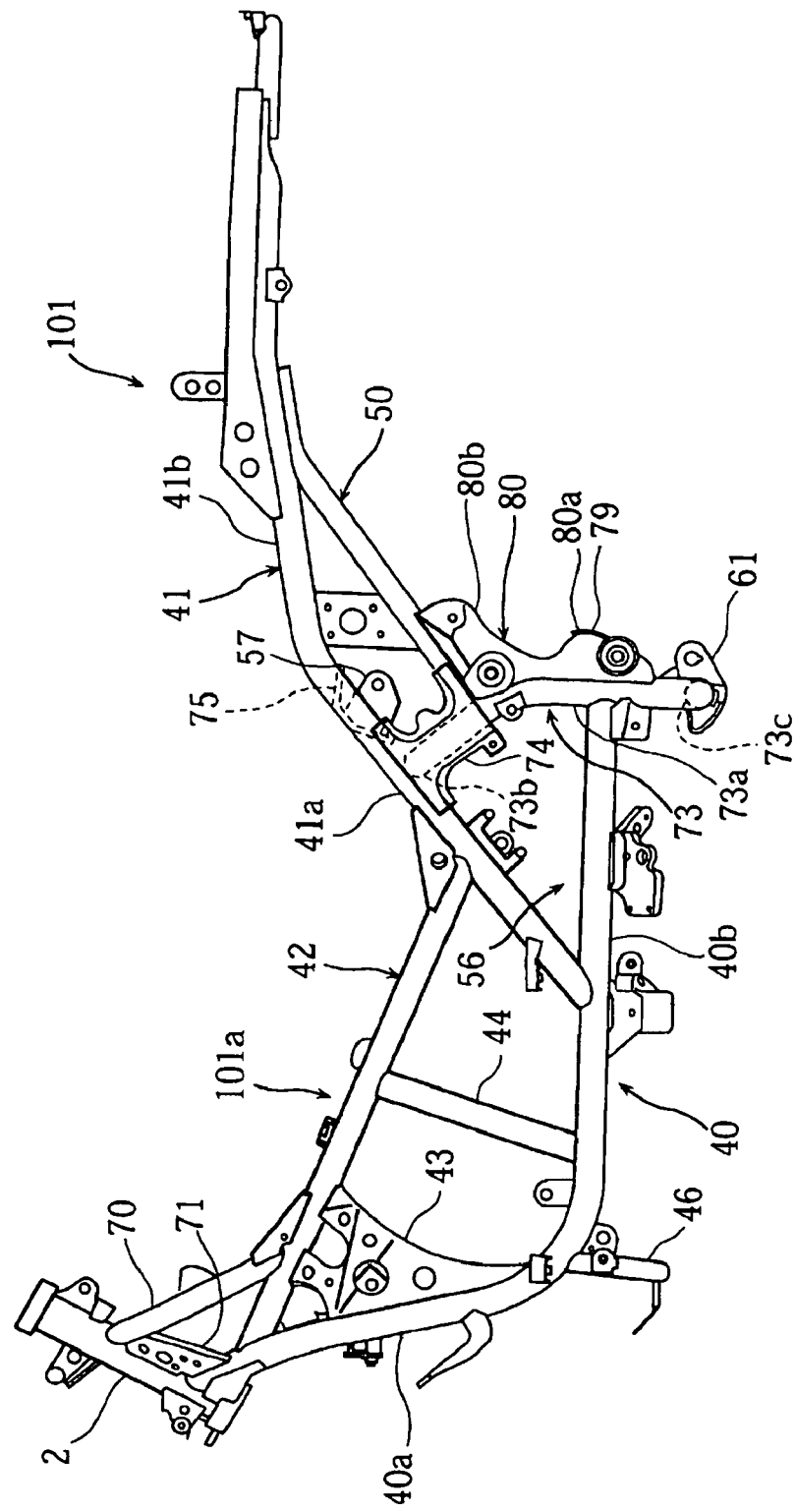
FIG. 9 is a side elevational view of a frame of the motorcycle of FIG. 8.
Figure 10:
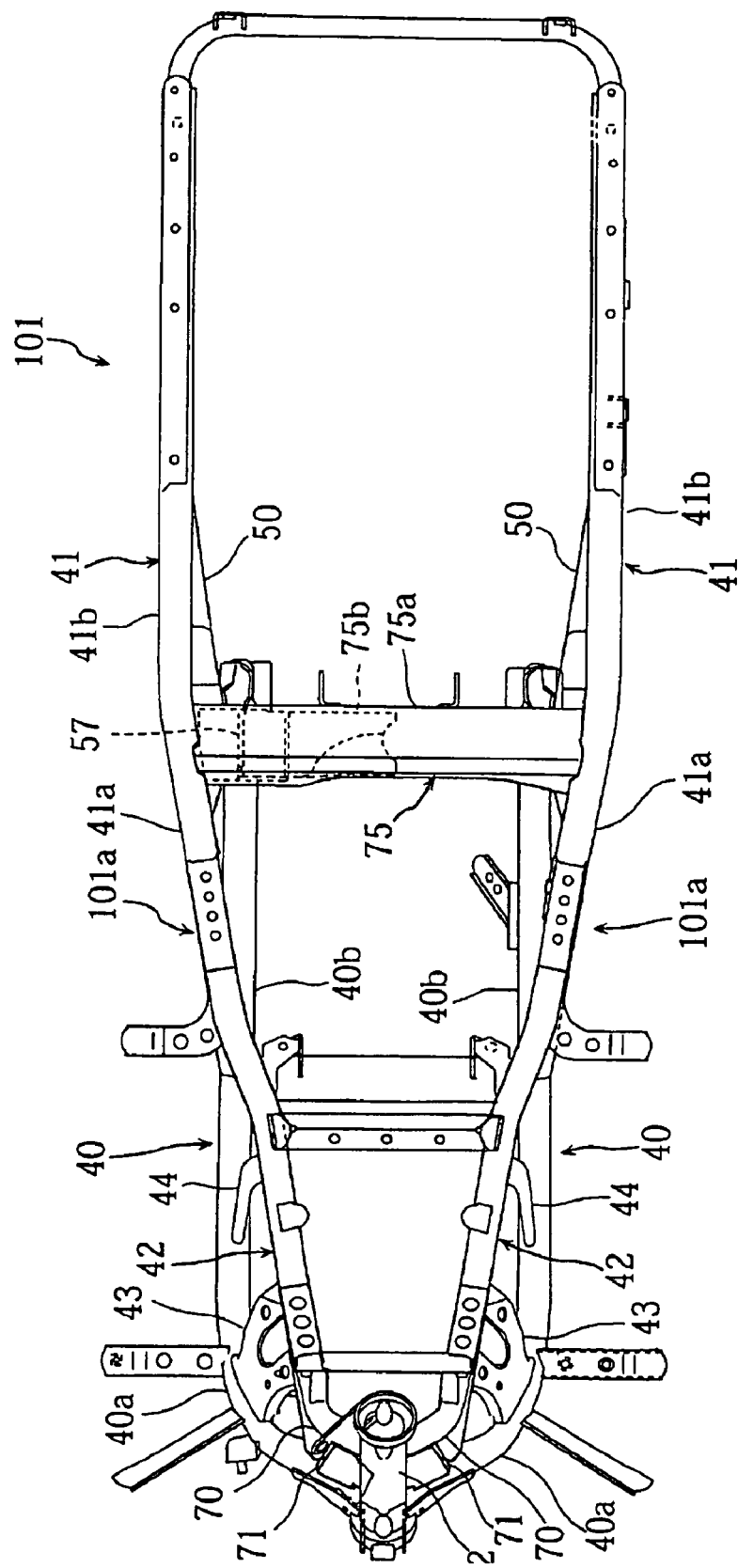
FIG. 10 is a top plan view of the frame of FIG. 9.

With reference to FIG. 7, the transmission case 11 can comprise a case body 11a adjoining the crank case 13 and extending to the region near the rear wheel 8. A case cover 24 can be mounted detachably on the left side mounting face of the case body 11a.

The driving sheave 20 can include a moving sheave 20a mounted to the crankshaft 12 such that it is movable in the axial direction and rotated with the crankshaft 12. A fixed sheave 20b can be fixed to the crankshaft 12 such that it is immovable in the axial direction and rotated with the crankshaft 12. However, other configurations can also be used.

The driven sheave 21 can include a driven shaft 25 supported by the transmission case 11 at the rear end. A fixed sheave 21a can be mounted to the driven shaft 25 such that it is rotatable and is immovable in the axial direction. A moving sheave 21b can be mounted such that it is rotatable with the fixed sheave 21a and movable in the axial direction. A centrifugal clutch 26 can be disposed between the fixed sheave 21a and the driven shaft 25.

Engine power can be transmitted from the crankshaft 12 to the driven sheave 21 through the driving sheave 20 and V-belt 22, and from the driven sheave 21 to the driven shaft 25 through the centrifugal clutch 26. Rotation of the driven shaft 25 can be transmitted to the rear wheel 8 mounted on the drive shaft 28, through a main shaft 27 disposed parallel to the driven shaft 25 and a drive shaft 28.

With reference to FIG. 1, the engine body 9 can be disposed approximately horizontally such that the angle θ made by extension A' of the straight line A connecting the rotation center of the driven sheave 21 and that of the driving sheave 20 and the cylinder axis B is no larger than 45° and can be approximately 10° in some embodiments.

With reference to FIG. 6, the cylinder block 15, cylinder head 16 and head cover 17 can be offset, when viewed in the direction of the crankshaft, such that the extension B' of the cylinder axis B passes a position offset downward by t (about 5-7 mm) from the crank axis P.

The bottom of the crank case 13 can be formed with an oil storage section 13a for storing lubricating oil supplied to regions to be lubricated such as bearings and sliding portions. The oil storage section 13a can be formed bulging such that its bottom surface can be positioned below the lower surface of the transmission case 11.

The front wall of the oil storage section 13a can be formed with a pair of left and right pivot sections 13b, 13b projecting forwardly. The left and right pivot sections 13b can be disposed, when viewed in the direction of the crankshaft, on the cylinder block 15 side of an imaginary plane C including the crank axis P and perpendicular to the cylinder axis B, and below the lower surface 15a of the cylinder block 15.

Figure 2:
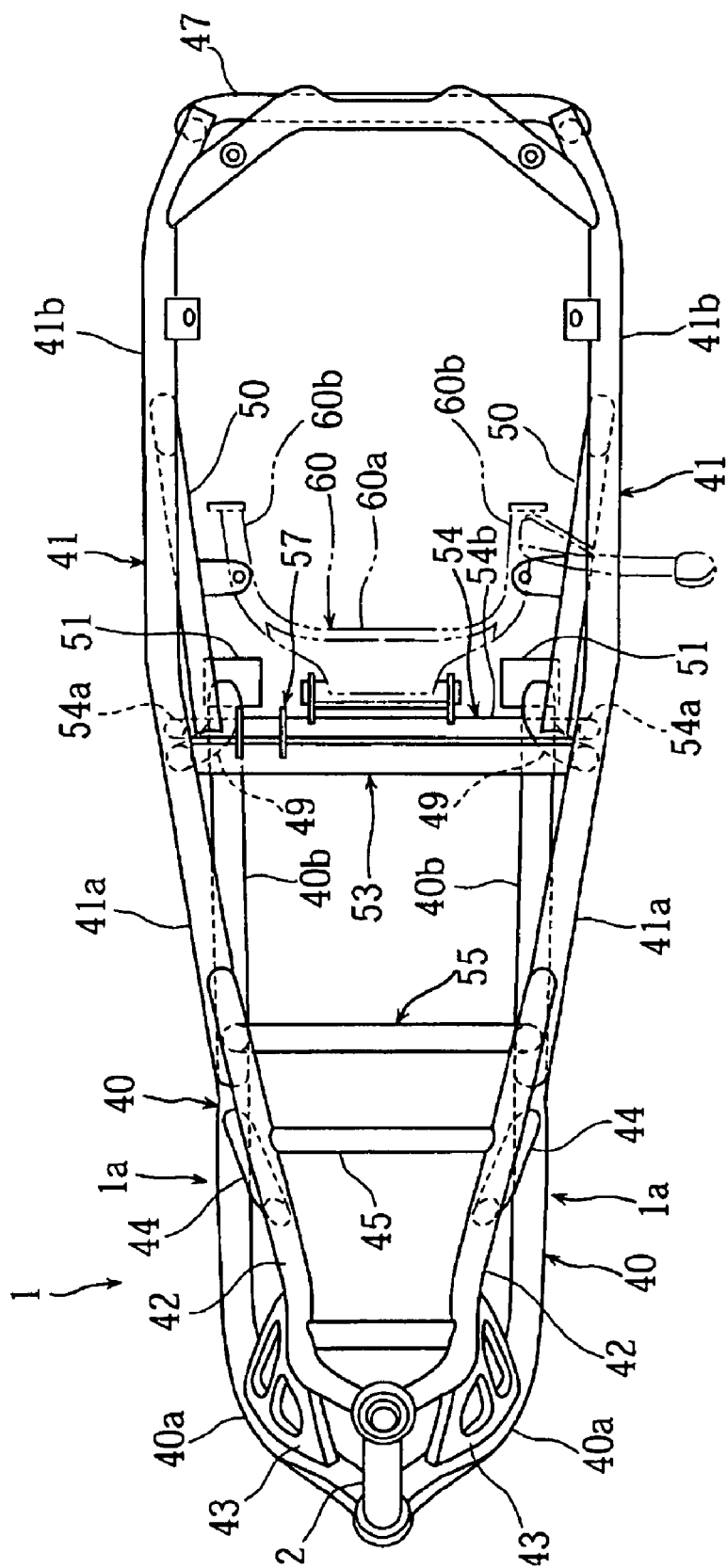
FIG. 2 is a top plan view of the frame.

With continued reference to FIGS. 1 and 2, the first and second frame members 1a, 1a include a pair of left and right first and second down tubes 40, 40 connected to the head pipe 2, and a pair of left and right first and second seat rails 41, 41 connected to the first and second down tubes 40.

The first and second down tubes 40, 40 have first and second lower oblique side sections 40a, 40a connected to the lower end of the head pipe 2 and extending obliquely downward toward the rear while spreading laterally outwardly, and first and second lower horizontal side sections 40b, 40b extending rearwardly and approximately horizontally from the lower ends of the lower oblique side sections 40a.

The first and second seat rails 41, 41 have first and second upper oblique side sections 41a, 41a extending obliquely upward toward the rear from the longitudinally halfway parts of the first and second lower horizontal side sections 40b of the first and second down tubes 40, and first and second upper horizontal side sections 40b, 40b extending a little obliquely upward from the upper ends of the first and second upper oblique side sections 41a. The seat 6 can be disposed on the left and right first and second upper horizontal side sections 41b, 41b.

Figure 3:
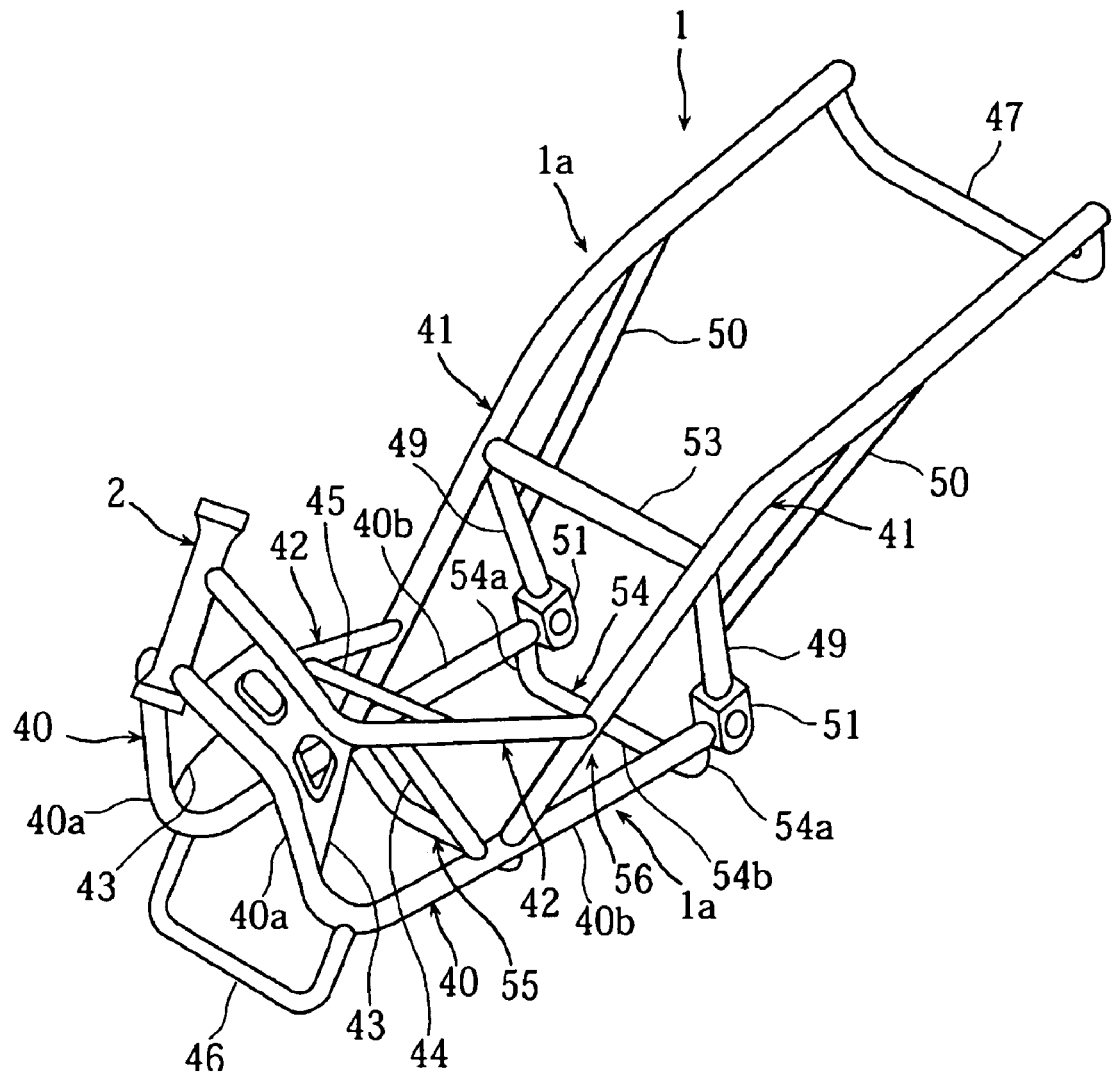
FIG. 3 is a front, top, and left side perspective view of the frame.

With continued reference to FIGS. 1-3, to the upper end of the head pipe 2 can be connected the forward ends of left and right first and second upper tubes 42, 42 extending obliquely downward toward the rear approximately along the down tubes 40. The rear ends of the first and second upper tubes 42, 42 are connected to the lower parts of the upper oblique side sections 41a of the first and second seat rails 41.

The first and second lower oblique side sections 40a, 40a of the first and second down tubes 40 and the forward parts of the first and second upper tubes 42 are joined together by gussets 43, 43.

In addition, regions of the first and second lower horizontal side sections 40b, 40b of the first and second down tubes 40 ahead of the connecting portions thereof with the seat rails 41 and regions of the first and second upper tubes 42 behind the gussets 43 are connected by coupling pipes 44, 44 inclined upward toward the front.

Further, regions of the first and second upper tubes 42, 42 behind the connecting portions thereof with coupling pipes 44 are connected to each other by an upper cross pipe 45.

The lower ends of the lower oblique side sections 40a of the first and second down tubes 40 are connected to each other by a front cross pipe 46 projecting obliquely downward toward the front in the shape of approximately a letter C opening upward. A radiator (not shown) and the like are attached to the front cross pipe 46.

The rear ends of the upper horizontal side sections 41b of the first and second seat rails 41 are connected to each other by a rear cross pipe 47 projecting downward in the shape of approximately a letter C opening upward. A seat lock, a tail light unit (not shown) and the like are attached to the rear cross pipe 47.

Between the upper parts of the first and second upper oblique side sections 41a, 41a of the first and second seat rails 41 and the rear ends of the first and second lower horizontal side sections 40b, 40b of the first and second down tubes 41 are disposed a pair of left and right, first and second vertical frame members 49, 49 extending in the vertical direction.

The upper ends of the left and right vertical frame members 49 are connected to the upper oblique side sections 41a. The lower ends of the left and right vertical frame members 49 and the rear ends of the lower horizontal side sections 40b are joined together through suspension members 51, 51.

The vertically halfway parts of the left and right vertical frame members 49 and the longitudinally halfway parts of the upper horizontal side sections 41b are connected by a pair of left and right seat stays 50, 50 extending obliquely upwardly.

The connecting portions of the first and second seat rails 41, 41 with the first and second vertical frame members 49, 49 can be connected to each other by a first cross member 53 extending in a generally lateral direction. The left and right vertical frame members 49 and first cross member 53 can be formed integrally in some embodiments.

The rear ends of the first and second lower horizontal side sections 40b, 40b of the first and second down tubes 40 can be connected to each other by a second cross member 54 extending in the generally lateral direction. The connecting portions of the first and second lower horizontal side sections 40b, 40b with the first and second upper oblique side sections 41a, 41a can be connected to each other by a third cross member 55 extending in the generally lateral direction.

The second and third cross members 54, 55 can each be in the shape of approximately a letter C opening upwardly, having left and right vertical side sections 54a, 54a, 55a, 55a extending downwardly from the first and second horizontal side sections 40b, and horizontal side sections 54b, 55b for connecting the left and right vertical side sections 54a, 55a to each other. The second cross member 54 can be formed such that it is located below the lower surface of the third cross member 55.

A high-rigidity section 56 in the shape of approximately a triangular pillar can be formed by the rearward halves of the first and second lower horizontal side sections 40b, first and second upper oblique side sections 41a and left and right vertical frame members 49, and first, second and third cross members 53, 54, 55.

Figure 4:
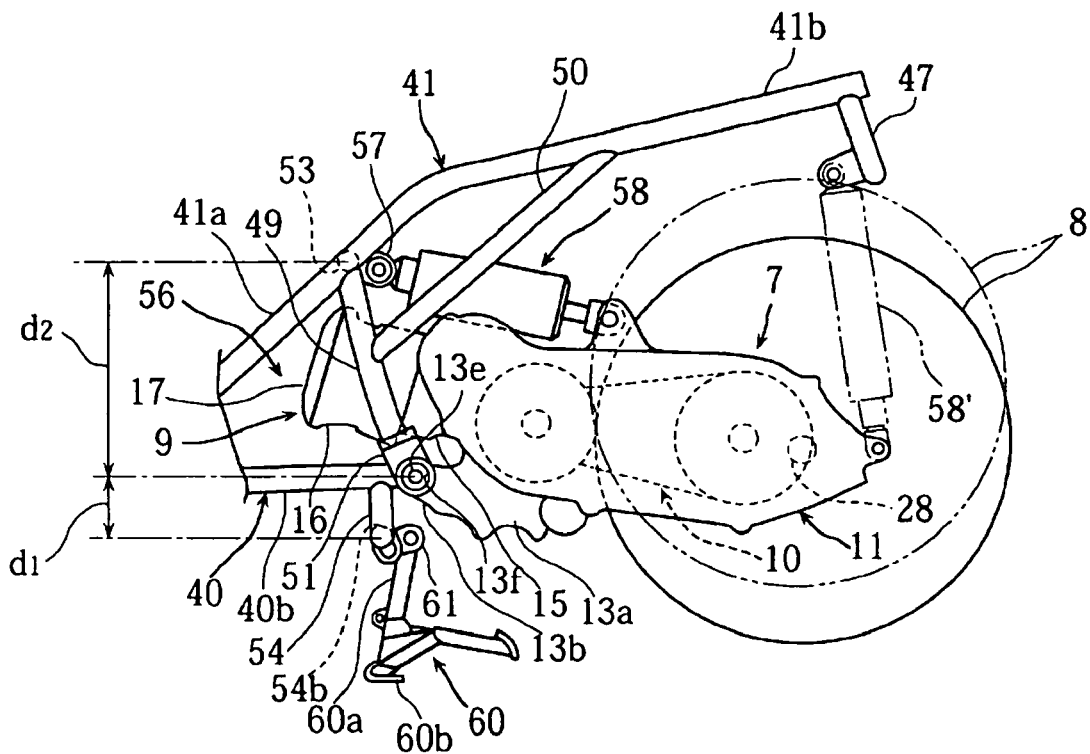
FIG. 4 is an enlarged side elevational view of the engine unit illustrating its connection to the frame.

With continued reference to FIGS. 1 and 2, a bracket 57 can be connected to the right side end of the first cross member 53. The forward end of a rear cushion 58 (which can also be referred to as a damper of shock absorber) can be coupled to the bracket 57, as shown in FIG. 4, and the rear end of the rear cushion 58 can be coupled to the upper wall of the engine unit 7. The rear cushion 58 can be disposed horizontally such that the axis of the rear cushion 58 can be approximately parallel to the cylinder axis B in the so-called 1G condition in which only the body weight is exerted on the cushion. As shown in FIG. 4 by a double dot and dash line, a rear cushion 58' can be disposed vertically between the rear end of the transmission case 11 and the rear cross pipe 47, in some embodiments.

The second cross member 54 can be provided with a main stand 60, as shown in FIG. 2 and FIG. 4. The main stand 60 can be supported so as to be swingable or pivotable between a standing or deployed position in which the main stand 60 supports the frame in a standing position, and a retracted or stowed position in which the stand 60 is in abutment against the bottom of the engine body 9, for use during operation of the motorcycle.

The main stand 60 can be configured such that a stand body 60a can be formed integrally with left and right legs 60b, 60b. The stand body 60a can be supported on a stand bracket 61 fixed to the horizontal side section 54b of the second cross member 54, and can be biased by a spring (not shown) toward stowed position.

In addition, the stand body 60a can be fitted with a shock absorbing member (not shown) to be in abutment against a stopper face 13d formed on the bottom of the oil storage section 13a. The stopper face 13d can be formed thick so as to project downward from the bottom of the oil storage section 13a, as shown in FIG. 6, and can be inclined upward toward the rear to control fluctuations in the road clearance of the main stand 60 due to fluctuations in the up and down stroke of the rear wheel 8.

The engine unit 7 can be supported, at its left and right pivot sections 13b, by the suspension members 51 for up and down swinging movement through a pivot shaft 13e and elastic bushings 62.

Figure 5:
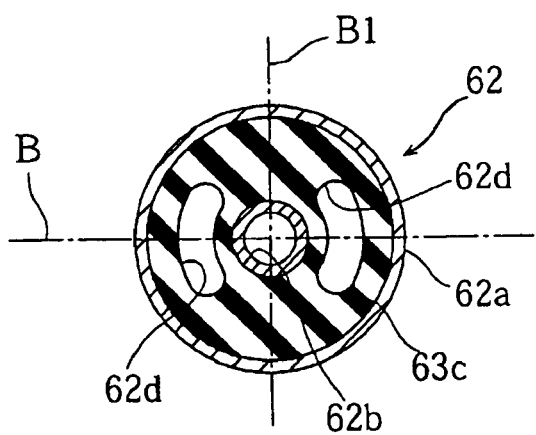
FIG. 5 is a sectional view of an elastic bushing that can be used for supporting the engine unit.

The elastic bushing 62 can be configured, as shown in FIG. 5, such that a rubber member 63c can be placed and bonded between an outer pipe 62a and an inner pipe 62b, and inserted between a pivot hole 13f of the pivot section 13b and the pivot shaft 13e. The rubber member 63c can have vacant holes 62d, 62d to produce soft spring properties in the direction of the cylinder axis B, and hard spring properties in the direction of B1 perpendicular to the cylinder axis B.

The engine unit 7 can be mounted on the frame such that part of the engine body 9 can be located in the high-rigidity section 56 surrounded by the left and right vertical frame members 49 and first and second cross members 53, 54.

For example, in some embodiments, approximately a front half of the cylinder head 16 of the engine body 9, and the head cover 17, can be mounted on the body such that they are located in the foregoing high-rigidity section 56, and the first and second cross members 53, 54 can be disposed above and below the cylinder head 16 with the cylinder axis (axis of the cylinder) B held therebetween, respectively. Further, the left and right vertical frame members 49 can be disposed to the left of and to the right of the cylinder head 16 with the cylinder axis B held therebetween, respectively. When viewed from the side of the vehicle, the cylinder head 16 can be disposed such that its cylinder axis B crosses the vertical frame 49.

In some embodiments, the distance d1 between the center of the pivot section 13b and that of the horizontal side section 54b of the second cross member 54 can be set shorter than the distance d2 between the center of the pivot section 13b and that of the first cross member 53. Further, the second cross member 54 can be disposed forward and below of and near the pivot section 13b. However, other configurations can also be used.

In some embodiments, as noted above, the first and second cross members and the pivot section can be arranged approximately in a straight line. As used herein, the term "approximately in a straight line" includes a configuration in which the pivot section is located precisely on a straight line connecting the first and second cross members and a configuration in which the pivot section is offset from the foregoing straight line to such an extent that the angle made by the foregoing first and second cross members and the pivot section is no smaller than about 120°.

According some embodiments, the upper oblique side sections 41a of the first and second seat rails 41 and the lower horizontal side sections 40b of the first and second down tubes 40 are connected by the left and right vertical frame members 49. Additionally, the connecting portions of the frame members 49 with the upper oblique side sections 41a and lower horizontal side sections 40b can be connected to each other by the first and second cross members 53, 54, so that the rigidity of the frame 1 can be improved.

In addition, the first and second cross members 53, 54 can be disposed with the cylinder axis B held therebetween, above and below the engine body 9 disposed leaning forwardly such that the cylinder axis B can be approximately in a horizontal direction, respectively, so that the engine body 9 can be surrounded by the first and second cross members 53, 54 and first and second frame members 1a, 1a, and the supporting rigidity of the engine by the frame 1 can be enhanced.

In some embodiments, the cross members 53, 54 for connecting the first and second frame members 1a to each other are disposed with the cylinder axis B held therebetween vertically, so that the foregoing function and effect can be further enhanced without causing a problem in increasing the number of parts or weight.

Further, the first and second cross members 53, 54 can be disposed above and below the cylinder head 16, respectively, and the pivot shaft 13e of the engine unit 7 can be located near the second cross member 54. As such, that interference of the first cross member 53 with the intake pipe 19 or the like when the engine unit 7 makes up and down swinging movements can be avoided and the rigidity of the frame 1 can be maintained.

In some embodiments, the upper parts of the upper oblique side sections 41a of the first and second seat rails 41 and the rear ends of the lower horizontal side sections 40b of the first and second down tubes 40 can be connected by the left and right vertical frame members 49, 49. The first and second cross members 53, 54 can be disposed near the upper and lower connecting portions of the left and right vertical members 49 and the cylinder head 16 can be disposed such that the cylinder axis B crosses the vertical frame members 49. As such, the engine body 9 can be surrounded by the left and right vertical frame members 49 and first and second cross members 53, 54, and the supporting rigidity of the engine 9 by the frame 1 can also be enhanced.

In some embodiments, the rear ends of the lower horizontal side sections 40b of the first and second down tubes 40 and the lower ends of the left and right vertical frame members 49 are joined together through the suspension members 51 and the pivot sections 13b of the engine unit 7 can be supported by the suspension members 51, so that the engine unit 7 can be directly supported by the frame 1 and a feeling of directness during acceleration and deceleration and the supporting rigidity of the engine unit can be enhanced compared with when the engine unit is supported, for example, through a link mechanism.

For example, if the engine unit 7 is suspended through a link mechanism, such a link causes an increase in the degree of freedom of movement. This can change the behavior of the body during operation and can reduce a feeling of directness during acceleration and deceleration. During acceleration, for example, the link mechanism only stabilizes its posture and is allowed to transmit driving force from the engine unit to the body above the spring when it moves to a position where a balance between forces can be achieved. On the contrary in some embodiments of the present engine unit 7, since no link mechanism is provided, a feeling of directness can be improved, and in addition, since the rigidity of the frame 1 itself is high in the region where the driving force from the engine unit is received, a higher feeling of directness can be achieved.

The engine unit 7 can be supported through the elastic bushings 62 so that the vertical load exerted on the rear wheel 8 can be absorbed. In addition, the elastic bushings 62 can have soft spring characteristics in the direction of the cylinder axis B, so that both of the primary vibration and the secondary vibration due to the primary inertia force of the engine body 9 can be absorbed. Further, it can also have hard spring characteristics in the direction of B1 perpendicular to the cylinder axis B, so that the supporting rigidity of the pivot sections 13b of the engine unit 7 to the relative torsion can be enhanced, improving the driving stability.

The pivot section 13b can be disposed on the cylinder block 15 side of the imaginary plane C including the crank axis P and perpendicular to the cylinder axis B when viewed in the direction of the crankshaft as well as below the lower surface 15a of the cylinder block 15, so that the pivot section 13b can be located near the cylinder block 15 of high rigidity and the supporting rigidity can be enhanced further.

In some embodiments, the distance d1 between the pivot section 13b and the second cross member 54 can be set shorter than the distance d2 between the pivot section 13b and the first cross member 53, so that interference due to up and down swinging movement of the engine unit 7 can be avoided while the supporting rigidity of the pivot section 13b can be enhanced.

The second cross member 54 can be disposed forward and below and near the pivot section 13b, so that the second cross member 54 can be disposed in close proximity to the pivot section 13b and the supporting rigidity of the engine unit 7 can be enhanced also in this respect.

In some embodiments, a high-rigidity section 56 in the shape of approximately a triangular pillar can be formed by the first and second lower horizontal side sections 40b, upper oblique side sections 41a and left and right vertical frame members 49, and first, second and third cross members 53, 54, 55, and the pivot section 13b can be located in the high-rigidity section 56, so that the supporting rigidity of the engine unit 7 can be enhanced.

The main stand 60 can be supported by the horizontal side section 54b of the second cross member 54 forming the high-rigidity section 56, so that the supporting rigidity of the main stand 60 can be enhanced.

The forward end of the rear cushion 58 coupled to the engine unit 7 can be coupled to the first cross member 53 forming the high-rigidity section 56, so that the rigidity to the load from the rear wheel 8 can be enhanced.

In some embodiments, the cylinder block 15 and cylinder head 16 can be disposed approximately horizontally such that the angle made by the extension A' of the straight line A connecting the rotation centers of the continuously variable transmission mechanism 10 and the cylinder axis B can be no larger than 45° and can be about 10°, so that the cylinder block 15 can be brought close to the pivot section 13b, and the supporting rigidity of the engine unit 7 can be enhanced.

In some embodiments, the cylinder block 15 and cylinder head 16 are disposed offset such that the extension B' of the cylinder axis B passes through a position offset below the crank axis P, so that the cylinder block 15 can be brought closer to the pivot section 13*b*. This reduces the rotational inertia of the engine unit around the pivot and thus the response characteristics of the under-spring components such as wheels to the road surface becomes better, and as a result, a riding feeling becomes better.

Furthermore, because of the engine body 9 being offset below of the crank axis and because the rotational direction of the crankshaft 12 can be the same as that of the front and rear wheels, loss horsepower of the engine can be reduced.

That is, because of the foregoing offset, the axis of the connecting rod is approximately parallel to the cylinder axis at the moment when the compressive load to the connecting rod (reaction from the connecting rod) becomes highest in the expansion stroke in the combustion chamber. At this time, the reaction from the connecting rod is not applied to the piston as a component perpendicular to the cylinder axis and the sliding resistance of the piston to the cylinder can be reduced to a minimum, so that loss horsepower of the engine can be reduced.

Although some of the above embodiments have been described with engine 7 being an internal combustion engine, the inventions disclosed herein can also be applied where the engine 7 is replaced with an electric motor.

Further, although in the above embodiments the first to the third cross members 53 to 55 are formed by pipes, the inventions disclosed herein are not limited to pipes. Rather any structural members can be used, such as, for example, but without limitation, other structural members made by bending, drawing or the like.

FIG. 8 through FIG. 14 illustrate a modification of the motorcycle of FIGS. 1-7. In these figures, the same reference numerals as in FIG. 1 through FIG. 4 designate the same or corresponding parts.

A frame 101 of this embodiment can have a head pipe 2 disposed at the forward end of the body, and a pair of left and right first and second frame members 101*a*, 101*a* extending rearwardly from the head pipe 2.

The first and second frame members 101*a* can include a pair of left and right first and second down tubes 40, 40 connected to the head pipe 2. A pair of left and right first and second seat rails 41, 41 can be connected to the first and second down tubes 40. The basic structure of this motorcycle is substantially the same as that of FIGS. 1-7. Thus, the description of many of the parts that can be the same or similar to the corresponding parts of the motorcycle of FIGS. 1-7 is not repeated below.

First and second upper tubes 42, 42 coupled to the head pipe 2 and the first and second seat rails 41 can extend in a straight line from the head pipe 2 obliquely downwardly toward the rear of the motorcycle. The forward ends of the first and second upper tubes 42 can be connected to the forward ends of the first and second down tubes 40, and the rear ends of the first and second upper tubes 42 are connected to the longitudinally halfway parts of the upper oblique side sections 41*a* of the first and second seat rails 41.

The forward ends of the first and second upper tubes 42 and the upper end of the head pipe 2 can be coupled to each other by left and right reinforcement pipes 70, 70 extending upwardly toward the front generally parallel to the lower oblique side sections 40*a* of the first and second down tubes 40. The head pipe 2, the forward ends of the first and second down tubes 40, and the reinforcement pipes 70 can be coupled together with gussets 71, 71.

Coupling pipes 44, 44 coupling the first and second down tubes 40 and the first and second upper tubes 42 can extend at an inclination, upwardly toward the rear so as to be generally perpendicular to the upper tubes 42.

Figure 11:
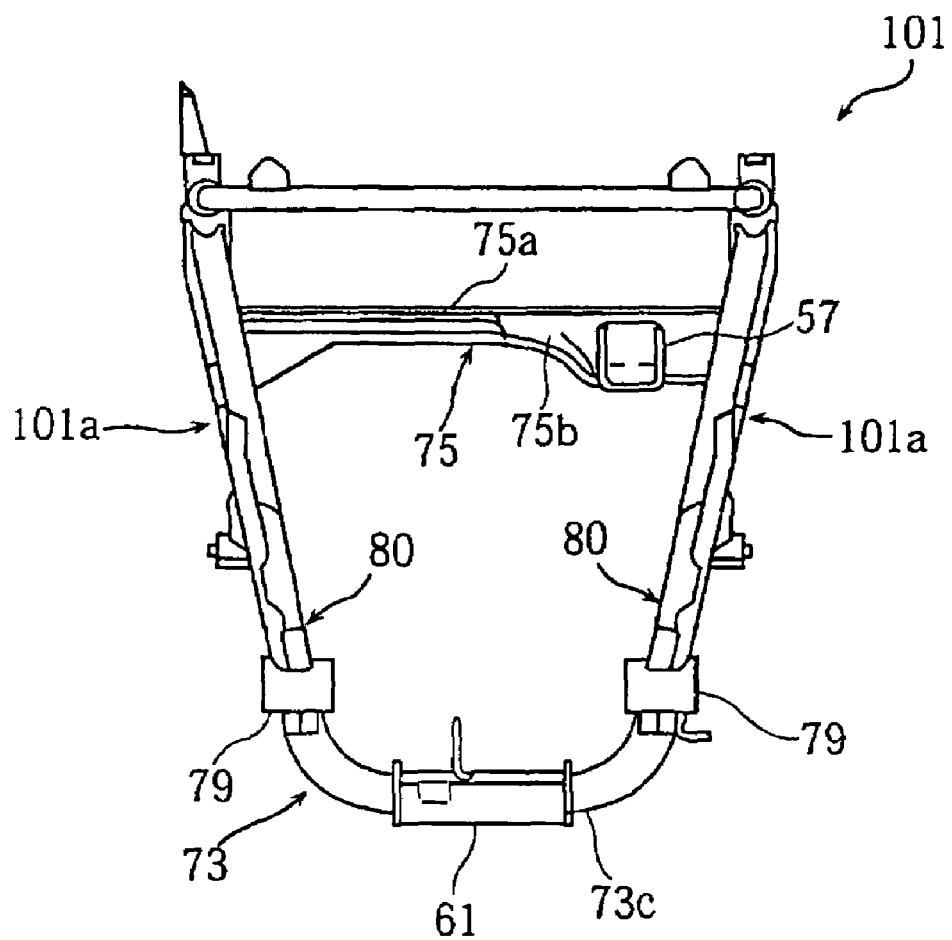
FIG. 11 is a rear elevational view of the frame of FIG. 9.
Figure 12:
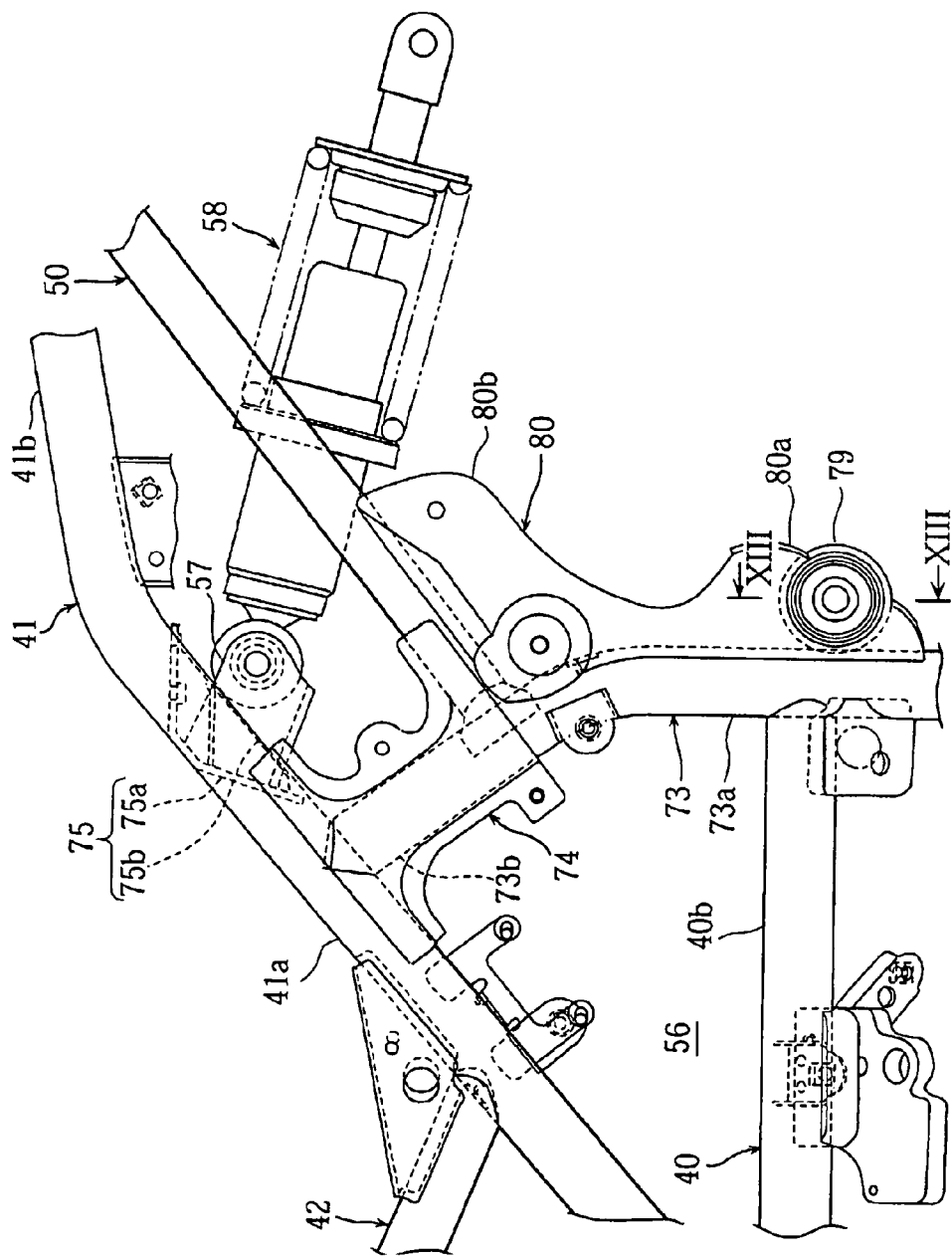
FIG. 12 is an enlarged side elevational view of a high-rigidity section of the frame.

First and second vertical frame members 73, 73 coupling the upper oblique side sections 41*a* of the first and second seat rails 41 and the rear end faces of the first and second lower horizontal side sections 40*b* of the first and second down tubes 40 can be formed in any manner. For example, the first and second vertical frame members 73 can include vertical sections 73*a*, 73*a* connected to the rear end faces of the first and second lower horizontal side sections 40*b* and can extend in a vertical direction. These frame members 73 can also include forwardly bent sections 73*b*, 73*b* extending from the upper ends of the vertical sections 73*a* obliquely upwardly toward the front. The forwardly bent sections 73*b*, 73*b* can be connected to and be generally perpendicular to the upper oblique side sections 41*a* of the seat rails 41. A cross section 73*c* (second cross member) can couple the lower ends of the left and right vertical sections 73*a* in a lateral direction. As shown in FIG. 11, the first and second vertical frame members 73 are in the shape of approximately a letter U when viewed in a longitudinal direction of the vehicle.

The left and right forwardly bent sections 73*b*, the upper oblique side sections 41*a*, and the forward ends of seat stays 50 can be joined together by coupling brackets 74, 74 in the shape of approximately a letter I when viewed in a transverse direction of the vehicle.

A first cross member 75 connecting the first and second seat rails 41 in the lateral direction can be disposed between the first and second seat rails 41 and above and near the connecting portions of the first and second seat rails 41 with the first and second vertical frame members 73.

The first cross member 75 can include a sheet-metal cross body 75*a* in the shape of approximately a letter V in cross section, and a reinforcement plate 75*b* joined to the right half of the cross body 75*a* so as to form a generally closed section. Although other configurations can also be used.

The right end of the first cross member 75 can be connected to a bracket 57 in the shape of approximately a letter C that is open upwardly for supporting the forward end of a rear cushion 58. The rear end of the rear cushion 58 can be supported by a rear arm 76 for supporting a rear wheel 8 for up and down swinging movement.

Left and right high-rigidity sections 56, 56 formed in the shape of approximately a triangle by the first and second frame members 101*a* can be coupled to each other by the first cross member 75, at their upper end portions. The lower rear end portions of the left and right high-rigidity sections 56, 56 can be coupled to each other by the second cross section 73*c*.

Pivot members 79, 79 can be disposed at regions of the first and second vertical frame members 73 near the connecting portion thereof with the down tubes 40. The left and right pivot members 79 can have a circular cylindrical shape and can be disposed, with the axes extending in the lateral direction, at positions rearward of the vertical sections 73*a* and generally opposing the lower horizontal side sections 40*b* of the down tubes 40.

The left and right pivot members 79, the vertical frame members 73, and the seat stays 50 can be joined together by suspension members 80, 80 having the shape of approximately a letter V. The suspension members 80 can be made of a pair of left and right sheet metal plates 81, 81 in the shape of a hollow box, and each can include a pivot section 80*a* surrounding and supporting the periphery of the pivot member 79, and a suspension section 80*b* extending upward along the rear face of the vertical section 73*a* and then extending along the lower face of the forward end portion of the seat stay 50. The suspension section 80b can also have a footrest for a rear rider (not shown) attached thereto.

Figure 13:
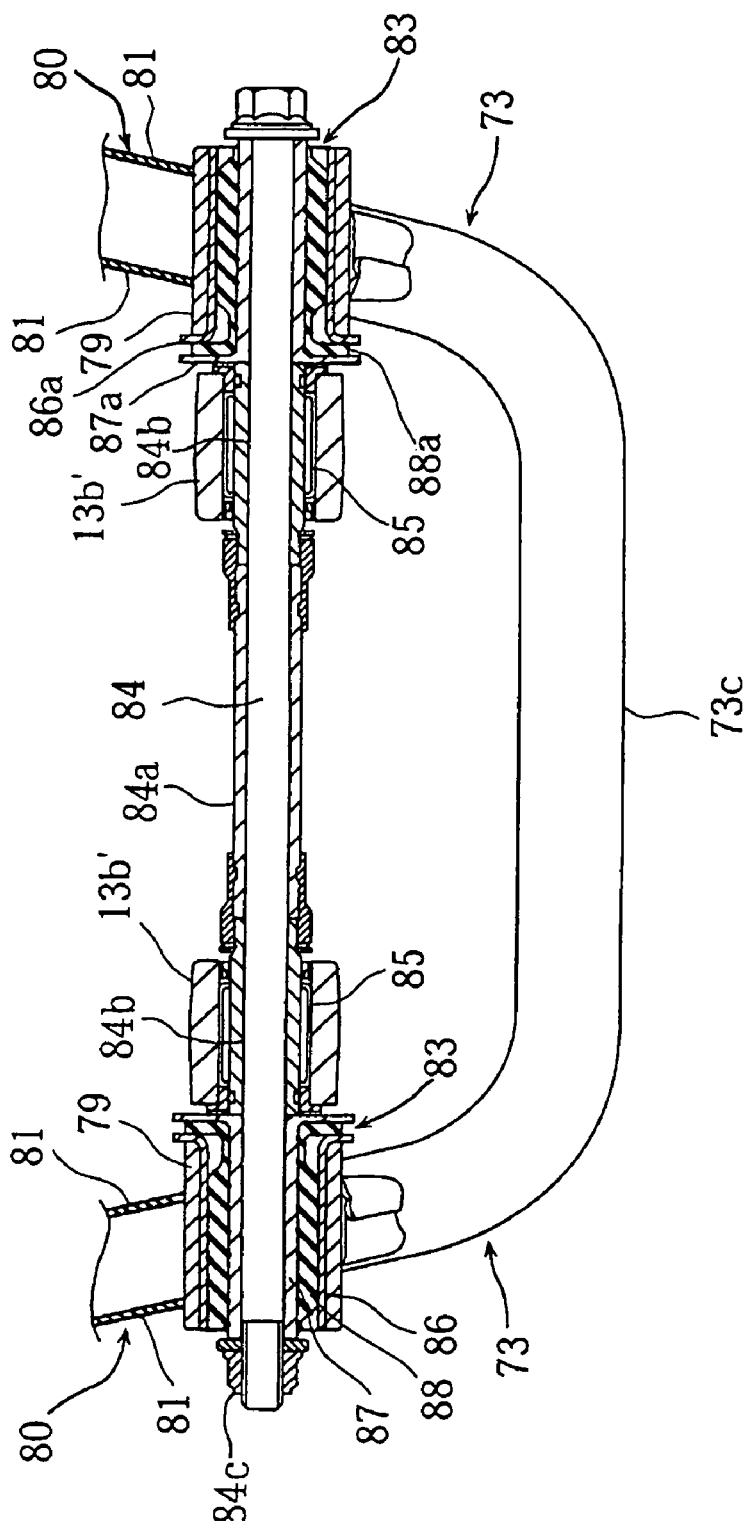
FIG. 13 is a cross-sectional view of the engine unit supporting section of the frame, taken along line XIII-XIII in FIG. 12.
Figure 14:
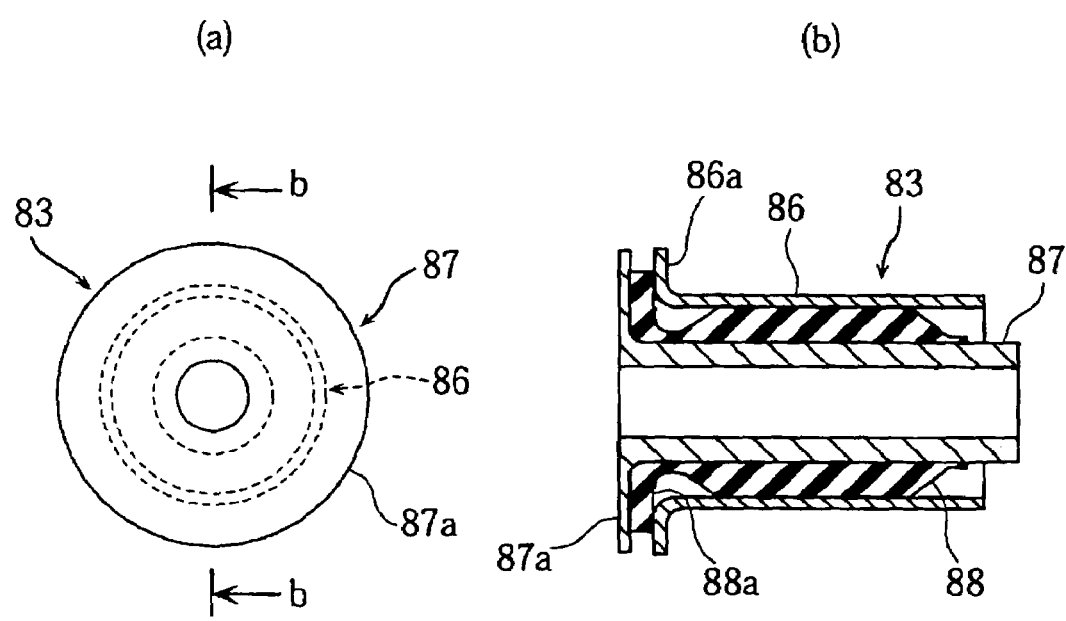
FIG. 14(*a*) is a side elevational view of an elastic bushing that can be used with the motorcycles of FIGS. 1-13.

As shown in FIG. 13 and FIG. 14, the engine unit 7 can be supported, at its left and right pivot sections 13b, 13b, by the left and right pivot members 79 for up and down swinging movement through a pivot shaft 84 and elastic bushings 83.

The left and right pivot sections 13b can be formed to project forward from the bottom wall of a crankcase 13, and can have the distal ends with circular cylindrical boss parts 13b'. The left and right boss parts 13b', 13b' can be located inside of the left and right pivot members 79 in the axial direction thereof and supported by the pivot shaft 84 through bearings 85, 85 for rotation. Reference numerals 84a, 84b denote collars. A nut 84c can permit positioning the elastic bushings 83 and the circular cylindrical boss parts 13b' in the axial direction.

The left and right elastic bushings 83 can each be configured such that a rubber member 88 can be mounted between an outer pipe 86 and an inner pipe 87 by fusion welding, or by any other attachment methods. The boss parts 13b', 13b' of the engine unit 7 can thus be supported on the pivot shaft 84 for up and down swinging movement, and the pivot shaft 84 can be elastically supported by the frame through the elastic bushings 83.

The outer pipe 86 can have an outer flange 86a projecting radially outside, at the periphery of its opening on the inside in the lateral direction. The inner pipe 87 at the periphery of the opening on the inside can have an inner flange 87a opposing the outer flange 86a with a gap therebetween. Between the inner flange 87a and the outer flange 86a, a flange part 88a can be disposed formed together with the rubber member 88. The elastic bushing 83 thus can have characteristics such that it can elastically deform easily in the longitudinal direction of the vehicle, whereas it does not elastically deform as readily in the lateral direction.

According to the motorcycle of some embodiments, the upper oblique side sections 41a of the first and second seat rails 41 and the lower horizontal side sections 40b of the first and second down tubes 40 can be connected by the left and right vertical frame members 73, and the connecting portions of the frame members 73 with the upper oblique side sections 41a and lower horizontal side sections 40b can be connected to each other by the first cross member 75 and the second cross member 73c. As such, the supporting rigidity of the engine unit 7 by the frame 101 can be improved. Such embodiments thus provide the same effect as the motorcycle of FIGS. 1-7.

In some embodiments, regions of the left and right first and second seat rails 41, 41 near the connecting portions thereof with the first and second vertical frame members 73, 73 can be coupled to each other by the first cross member 75 in the lateral direction. The first cross member 75 can be coupled to the forward end of the rear cushion 58 located generally horizontally in the longitudinal direction of the vehicle. The rear cushion 58 can be thus supported by the first cross member 75 coupling the left and right high-rigidity sections 56, 56, so that the supporting rigidity of the rear cushion 58 can be enhanced, and driving stability and a riding feeling can be improved.

In some embodiments, the rear ends of the left and right upper tubes 42 which extend in a straight line from the head pipe 2 obliquely downwardly toward the rear can be connected to the longitudinally halfway parts of the upper oblique side sections 41a of the left and right seat rails 41. The high-rigidity sections 56 can be thereby reinforced by the left and right upper tubes 42, enhancing the supporting rigidity of the engine unit 7 and the rear cushion 58.

In some embodiments, since the left and right vertical frame members 73 and the rear portions of the upper horizontal side sections 41b of the seat rails 41 can be coupled to each other by the left and right seat stays 50, 50, the high-rigidity sections 56 can be reinforced by the left and right seat stays 50, thereby further enhancing the supporting rigidity of the engine unit 7 and the rear cushion 58.

In some embodiments, the pivot members 79, 79 can be located at the regions of the left and right vertical frame members 73 near the connecting portions thereof with the down tubes 40. Additionally, the engine unit 7 can be supported by the left and right pivot members 79, 79 via the pivot shaft 84. The supporting rigidity of the engine unit 7 can be thereby enhanced.

In some embodiments, since the pivot members 79, the vertical frame members 73, and the seat stays 50 can be coupled together with the suspension members 80 in the shape of a hollow box, the high-rigidity sections 56 can be reinforced by the left and right suspension members 80, thereby further enhancing the supporting rigidity of the engine unit 7.

In some embodiments, the engine unit 7 can be supported on the frame 101 through the elastic bushings 83. The engine unit 7 can be thus elastically supported on the frame 101 in the longitudinal direction of the vehicle due to the elasticity of the rubber members 88 of the elastic bushings 83, so that a riding feeling during acceleration and deceleration can be improved.

The flange part 88a formed together with the rubber member 88 can be disposed between the outer flange 86a formed on the outer pipe 86 and the inner flange 87a formed on the inner pipe 87, so that the flanges 86a, 87a and 88a can limit the amount of lateral movement of the engine unit 7. The lateral swinging movement of the engine unit 7 can thus be prevented, and a riding feeling can be improved also in this respect.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A motorcycle comprising a frame having first and second side frame members, and a swing-type motor unit mounted on the frame for up and down swinging movement, the motor unit comprising a motor body and a transmission case having a power transmission mechanism housed therein, the motor body and the transmission case being joined together integrally, a pivot section supported by the frame formed in a region of at least one of the motor body and the transmission case below a motor output shaft, the frame comprising first and second cross members positioned with the pivot section disposed therebetween when viewed from the side of the motorcycle, the first and second cross members connecting the first and second side frame members, the first and second cross members and the pivot section arranged approximately in a straight line when viewed from the side of the motorcycle.

2. The motorcycle according to claim 1, wherein the motor unit is an engine unit in which an engine body and a transmission case are joined together integrally, and the motor output shaft is a crankshaft supported by the engine body.

3. The motorcycle according to claim 2, wherein the engine body has a cylinder arranged in a forward leaning state, the first and second cross members being disposed above and below the cylinder, respectively.

4. The motorcycle according to claim 3, wherein the frame comprises a head pipe, first and second down tubes having first and second lower oblique side sections extending downwardly from the head pipe, and first and second lower horizontal side sections adjoining the lower oblique side sections and extending approximately horizontally toward the rear of the motorcycle, the frame further comprising first and second seat rails having first and second upper oblique side sections extending obliquely upwardly toward the rear of the motorcycle from the halfway parts of the first and second lower horizontal side sections of the first and second down tubes and first and second upper horizontal side sections adjoining the first and second upper oblique side sections and extending rearwardly, the halfway parts of the first and second upper oblique side sections and the rear ends of the first and second lower horizontal side sections being connected by first and second vertical frame members, respectively, and the first and second cross members being disposed near connecting portions of the vertical frame members with the upper oblique side sections and the lower horizontal side sections, and wherein the cylinder extends across the vertical frame members when viewed from the side of the motorcycle.

5. The motorcycle according to claim 4 wherein the lower end of the vertical frame member and the rear end of the lower horizontal side section are joined through a suspension member and the pivot section is supported on the suspension member through an elastic bushing.

6. The motorcycle according to claim 4 wherein a third cross member is connected to connecting portions of the first and second lower horizontal side sections with the upper oblique side sections, a high-rigidity section in the shape of approximately a triangular pillar is formed by the first and second lower horizontal side sections, first and second upper oblique side sections and first and second vertical frame members, and the first, second and third cross members, and the pivot section is located in the high-rigidity section.

7. The motorcycle according to claim 6 wherein the second cross member is made up of vertical side sections extending downwardly from the first and second lower horizontal side sections and a horizontal side section for connecting both the vertical side sections to each other, and a main stand is supported on the horizontal side section.

8. The motorcycle according to claim 6, wherein a first end of a rear cushion is coupled to the engine unit and a second end of the rear cushion is coupled near the connecting portion of the first cross member with the vertical frame member.

9. The motorcycle according to claim 3, wherein the cylinder is disposed offset such that an extension of the cylinder axis passes through a position offset downwardly from an axis of a crankshaft of the engine.

10. The motorcycle according to claim 2, wherein the power transmission mechanism comprises a continuously variable transmission mechanism having a driving sheave disposed coaxially with a crankshaft of the engine, a driven sheave disposed on the rear wheel side and a V-belt stretched over both the sheaves, a cylinder of the engine body being disposed such that the angle made by the extension of a straight line connecting rotation centers of the driven sheave and driving sheave and the cylinder axis is no larger than about 45°.

11. The motorcycle according to claim 1, wherein the frame comprises first and second vertical frame members, each extending approximately in a straight line between a connection point of the first frame member with the first cross member and a connection point of the first frame member with the second cross member and between a connection point of the second frame member with the first cross member and a connection point of the second frame member with the second cross member, respectively, the cylinder extending across the first and second vertical frame members when viewed from the side of the motorcycle.

12. The motorcycle according to claim 11, wherein the pivot section is supported on the vertical frame member.

13. The motorcycle according to claim 12, wherein the pivot section is disposed on the cylinder side of an imaginary plane including an axis of a crankshaft of the engine and perpendicular to a cylinder axis of a cylinder of the engine, and below the bottom of the cylinder when viewed in the direction of the crankshaft.

14. The motorcycle according to claim 13 wherein a distance between the pivot section and the second cross member is shorter than a distance between the pivot section and the first cross member.

15. The motorcycle according to claim 14 wherein the second cross member is disposed below and near the pivot section.

16. The motorcycle according to claim 14 wherein the second cross member is disposed forward of and near the pivot section.

* * * * *